3,077,861
FARROWING CRATE
Ingvald Eide, Colton, S. Dak.
Filed Mar. 23, 1960, Ser. No. 17,046
10 Claims. (Cl. 119—20)

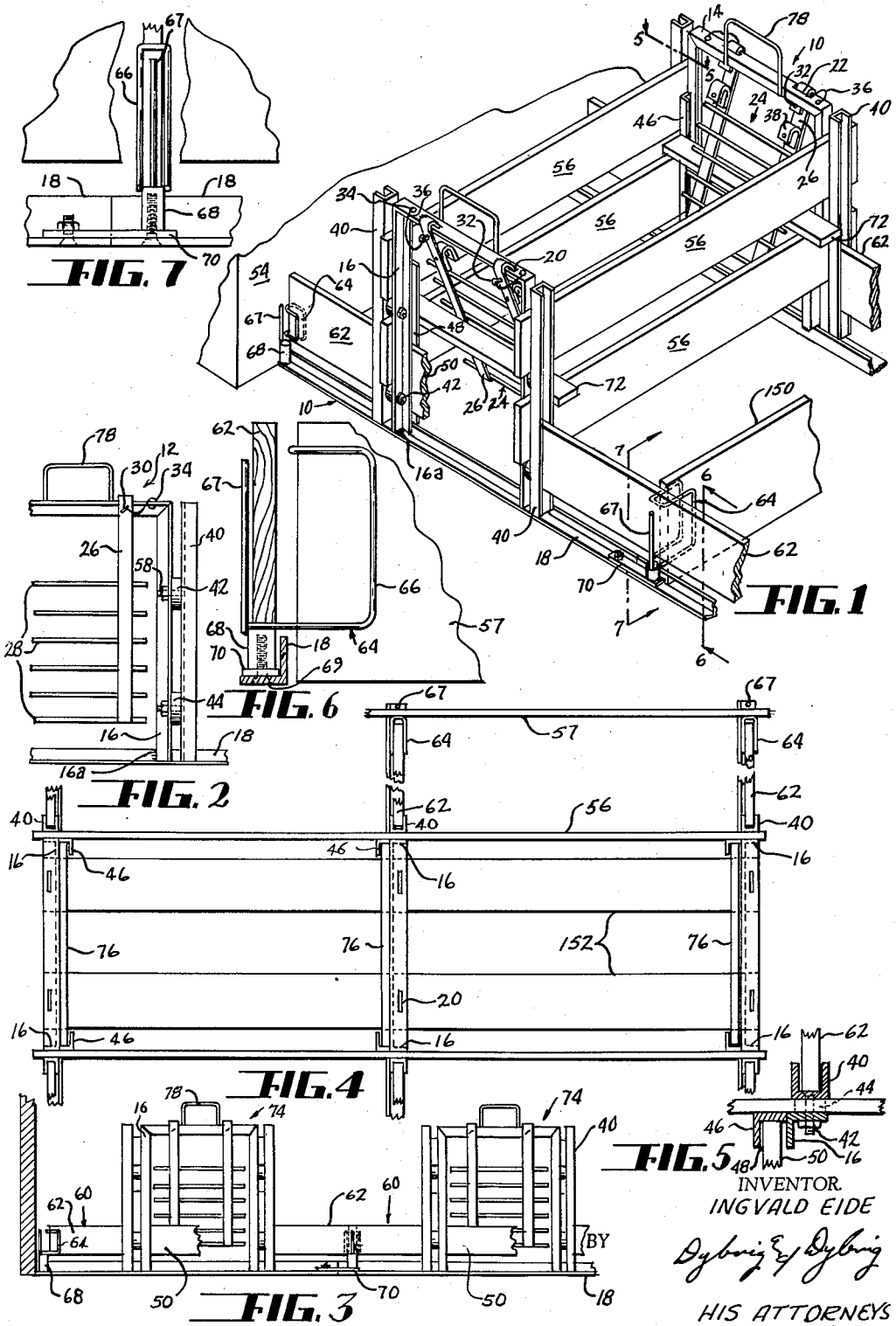

This invention relates to a farrowing crate of the type employed to retain sows in a constricted position while and after farrowing and to allow the newly-born pigs freedom of movement, thereby preventing the sow from harming the pigs by lying on them. The invention, however, is not necessarily so limited.

An object of this invention is to provide a farrowing crate having end gates allowing entry of the sow into the crate; but preventing exit of the sow therefrom, which crate may be readily disassembled for storage purposes.

Another object of this invention is to provide a crate enclosure having areas in which the newly-born pigs may run, the sow being prevented from entering such areas.

A further object of this invention is to provide a farrowing crate including a pair of identical end sections pre-formed for selling, storing and shipping, the crate being asembled by connecting conventional boards to the end sections.

A further object of this invention is to provide an assembly of farrowing crates made from identical crates which may easily be connected in an array or series. The crates may be joined either end-to-end to form columns or side-to-side to form rows, or both.

Another object of this invention is to provide pre-formed sections which may be connected to form one or several crates.

Other objects and advantages reside in the construction of parts, the combination thereof, the method of manufacture and the mode of operation, as will become more apparent from the following description.

Referring to the drawings,

FIGURE 1 is a perspective view, with portions cut away, of an assembled crate according to this invention.

FIGURE 2 is a partial end view of the crate shown in FIGURE 1.

FIGURE 3 is a partial end view showing a pair of crates joined side-to-side, having a runway therebetween.

FIGURE 4 is a diagrammatic top view showing a pair of crates joined end-to-end.

FIGURE 5 is an enlarged, fragmentary and cross sectional view, taken substantially on the line 5—5 of FIGURE 1.

FIGURE 6 is an enlarged, fragmentary, cross sectional view of a corner, taken substantially on the line 6—6 of FIGURE 1.

FIGURE 7 is an enlarged fragmentary view of the link mechanism used in connecting two farrowing crates together in the area of the section 7—7 in FIGURE 1.

According to this invention, a pair of identical end frames 10 are provided, each including an inverted U-shaped member forming a gate frame 12 having a top 14 and leg portions or sides 16 attached to an elongated base runner 18 in any suitable fashion, such as, for example, by welding as indicated at 16a. For rigidity, the gate frame 12 and base runners 18 may be made from metal angle bars, as shown in the drawing. The top of the gate frame 12 is provided with a pair of slots 20 for receiving hooks 22 for pivotally supporting an end gate 24. While many gate structures could be employed, the simple structure shown in the drawings, employing a pair of parallel bars or straps 26 provided with hooks 22 and connected by rods or bars 28, is quite effective. The straps 26 and hooks 22 are provided with coaxial apertures 30 for receiving locking pins 32, such as cotter pins, which retain the hooks in the slots. The pins may be attached, as shown at points 34, to the top 14 of the frame 12 by means of leather straps or chains 36, or the like, so that when the pins 32 are removed, they will not readily be displaced. The straps 26 are provided with a second pair of hook members 38, so that the height of the gates may be adjusted.

Each leg portion 16 of the gate frame 12 is provided with supporting means comprising an outwardly directed channel member 40 connected thereto by means of bolts 42, or the like, as shown most clearly in FIGURE 2. Also, as shown in FIGURE 2, each bolt 42 may extend through a spacer block 44 which separates the channel members 40 from the leg portions 16. While the channel members 40 are shown as extending from the top of the gate frame down to the base runner 18, they may be shorter. That is, there is no necessity for the channel members 40 to engage the base runner 18.

Each of the leg portions is also provided with an L-shaped or angle iron member 46 forming, with the leg portions 16, inwardly directed channels 48 for the reception of a non-pivotal gate member. The non-pivotal gate member is indicated in FIGURE 1 as simply being a board or a plurality of boards 50, or the like, placed within the channels 48. Obviously, any suitable gate may be provided which would fit within the channel 48. A higher gate may be used, so as to eliminate the use of the gate 24.

The end frames 10, including the gate frame 12, the outwardly directed channel member 40, the elongated base runner 18 and the L-shaped members 46 providing the inwardly directed channels 48, may be sold, shipped and stored as a unit of a farrowing crate which may be assembled by the owner or purchaser thereof. The gates 24 may be included in the end frame unit, if desired by the purchaser. The inwardly directed channels 48 were described above as being formed between a side of the leg portions 16 and the angular L-shaped members 46.

The crate is assembled as follows: A pair of end frames 10 are placed in parallel spaced relation, as shown in FIGURE 1. Conveniently, the end frames may abut a building wall 54. The board members 56 of the farrowing crate are then inserted between the end frames 10. The boards are supported between the leg portions 16 and their adjacent channel members 40 upon the spacer blocks 44 or the connecting bolts 42, if no spacer blocks are provided, and clamped between the leg portions 16 and channel members 40 by tightening nuts 58. Two such boards are shown in FIGURE 1; but it is obvious that more boards and connecting bolts could be used, if desired. Furthermore, boards of varying widths may be used. Thus it is seen that the farrowing crate includes an enclosure comprising a pair of end gates 10 interconnected by wall members 56 supported upon the connecting bolts 42 or spacer blocks 44.

The crate further includes a pair of outer enclosures providing runways 60 for the small pigs. For this purpose, the side of the end frames nearest the building wall are provided with side boards 62 supported at one end within the channel members 40 and at the other end by engagement with side board supporting devices 64 having a board clamp 66 mounted on a threaded base member 68 threadedly engaging the base runners 18. The other channel member 40 on each end frame 10 may likewise be provided with a side board 62 extending away from the crate, i.e. normal to the board member 56 thereof, and abutting another building wall or closed by a transverse outer wall board 57 shown in FIGURES 4 and 6. The ends of the boards 62 and 57 shown in FIGURE 6 are likewise supported by supporting devices 64 as will be more fully discussed below. It should be noted that the lower board member 56 on each side of the enclosure is supported several inches above the ground upon which the crate is positioned. With this structure, a sow may be confined within the crate while the small pigs may be allowed considerable freedom of movement in the outer enclosures or runways 60 bounded by the parallel pairs of side boards 62 and the building or the end board 57 or divider board 150.

It is believed that the use of the farrowing crate is obvious. The end gates 24 may pivot inwardly, as described above. Suitable stop means, such as a board 72 shown in FIGURE 1, placed behind the gate 24 and in abutment with the L-shaped members 46, prevent outward pivotal movement. It may readily be seen that a sow, when entering, will force the end gate 24 to pivot about the hinge formed by the slots 20 and hooks 22 to provide an opening. However, since the stop means 72 prevents movement of the end gates 24 outwardly, a sow in the crate may not leave the crate. Once a sow is within the crate, the stationary or non-pivotal gates may be placed within the channel and the pivotal gates may be detached from the gate frame for use in other crates. This construction is advantageous, in that only one or perhaps two of the pivotal end gates 24 need be purchased for use with several crates. The stationary gates may be purchased separately or made by the purchaser. The dimensions of the crate are such that a sow confined in the crate cannot turn around.

The individual crate as thus far described may be readily assembled and interconnected with other crates of substantially identical construction to form a series or an array of crates. As shown in FIGURE 3, several crates 74 may be connected side-by-side in rows, by simply providing parallel rows of aligned end frames and fastening adjacent base runners with locking devices interconnecting the fastening links or straps 70 provided at the extremities of each of the base runners 18. The side boards 62 may extend from the channel member 40 of one crate 74 to an opposed channel member 40 of a second crate 74 and so forth, so that several crates may be connected.

The crates may also be readily connected end-to-end in a column, as shown in FIGURE 4, by simply providing longer board members 56 for the sides of two or more crates. This arrangement has the advantage of requiring only three end frames 10 for forming every pair of crates, the middle end frame serving as a dividing wall. That is, there will be one less gate than the number of crates. With this construction, several crates can be fastened together to provide a structure sufficiently steady to confine the sows within the crates. Of course, the stationary end gates 76 shown in FIGURE 4 must necessarily be removed in order for the sow to enter the crate and, if several crates are interconnected in the manner shown in FIGURE 4, the sow may be forced to pass through several end gates.

Thus, a farrowing crate has been provided which comprises pairs of identical end frames 10 which may be connected with other pairs of end frames 10 in a side-by-side fashion for forming a series of crates. If desired, three or more end frames 10 may be joined to form several crates in an end-to-end fashion. The crates are made primarily of boards supported by the end frames to form wall members for the crates, or sow enclosures, and also to form side boards for runways for the small pigs. With this construction, a considerable savings in cost and storage space is provided. The end frames 10 may be sold as separate units, permitting the purchaser of then end frames to purchase the lumber separately, or use scrap lumber to assemble the crate. Also, the end frames 10 may be stacked one upon the other for storage and shipping, resulting in a considerable savings in cost and space. To further aid in storage, the top 14 of each gate frame may be provided with an upstanding frame 78 for holding loose or spare boards (not shown).

For sturdiness, it is desirable that the end frame be made of a metal such as steel. Of course, it is not necessary to use metal. It could be possible to make the entire crate of wood or other material. Also, it is obvious that the side walls and side boards can be made of a material other than wood.

The base runners, if desired, may be anchored in any conventional manner, such as by weights or posts embedded in the ground. Preferably, lower floor boards 152 (FIGURE 4) are laid across the base runners 18 beneath the end gates. The sows confined within the crate will remain on top of the floor boards so that anchoring devices would not be necessary. Since the nuts 58 and bolts 42 serve as clamping means to clamp the board members 56 in place between the leg portions 16 and channel members 40, the end frames 10 are held in a fixed relative position. Supplementary clamps (not shown) may also be provided for this purpose.

While the pivotal end gate 24 is quite useful, it is not necessary. A sow could be forced through the opening provided by the gate frame 12 and then a gate 76 could be quickly inserted into the channel for closing the opening. When using the pivotal gate, a single board 50 could be inserted into the channel after a sow is confined within the inner enclosure. Then the stop device, i.e. the board 72, could be removed, permitting the gate to pivot into a substantially vertical position, as shown in FIGURE 3. Also, instead of laying a board 72 on the board members 56 for use as a stop, brackets (not shown) could be provided on the exterior of the gate frame 12 for supporting a stop member exteriorly thereof. Obviously, many such arrangements could be used for blocking the gate frame opening.

An important aspect of the present invention is the outer enclosure providing the runway adjacent each side of the inner enclosures and communicating with similar enclosures of other crates when the crates 74 are assembled in rows, as shown in FIGURE 3. It may be desirable to provide a dividing wall centrally of the runway between the crates assembled in rows. For this purpose, the board supporting device 64, shown in FIGURES 1 and 6, is useful. As mentioned before, the supporting device 64 includes a base member 68 mounted on a threaded bolt 69 extending through the horizontal leg of base runner 18 and extending through a link or a strap 70 used in coupling two adjacent members 18 together. The supporting device 64 additionally includes metal rods bent to have parallel board engaging clamp portions 66 on one side of the base member 68 and an upwardly extending arm 67 on the other side. The space between the portions 66 and the arm 67 is sufficiently wide to receive a board. With this device, a board 62, such as that shown on the right in FIGURE 1, could rest on the base member 68 and be held between adjacent channels 40. The arm 67 aids in retaining the board upright, as shown most clearly in FIGURE 6. Since the bolt 69 is rotatably mounted within the fastening link 70, the board supporting device 64 may be rotated through 90° to support an outer wall 57 as shown in FIGURE 4, or the outer wall 57 could be supported at each end by portions 66 and each sideboard supported by a base member 68 and retained upright by an arm 67 as shown in FIGURE 6.

It can readily be seen that the lower boards 56 of the crate must be spaced sufficiently high so that the small pigs can walk under these boards, but sufficiently low so that the sow cannot crawl under these boards. The boards 50, 57, 62, and 150, forming the runways, must of necessity be sufficiently low that the small pigs cannot crawl under these boards. However, the boards defining the outer pen or runway for the pigs need not be very high, as the little pigs cannot jump over a rather low board.

After the small pigs get sufficiently old to take care of themselves, the sow confined in the crate and her litter may then be moved to other quarters and the crate made available for another sow and a new litter.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a farrowing crate having an inner enclosure defined by wall members and end gates, and outer enclosures defined by side boards extending from the sides of the inner enclosure, an end frame including: a gate frame for supporting an end gate for the inner enclosure, supporting means for supporting one end of the side boards for the outer enclosures, and clamping means interconnecting said gate frame and said supporting means and mounting said supporting means in spaced relation to the sides of the gate frame, said clamping means providing a support for one end of the wall members between the sides of said gate frame and said supporting means.

2. The end frame of claim 1, further including an elongated base runner upon which said gate frame is mounted, fastening plates mounted at the extremities of said runner, and supporting members mounted on said plates for supporting the other ends of the side boards.

3. The end frame of claim 2, in which said supporting members include means for supporting outer wall members for the outer enclosures.

4. In a farrowing crate having an inner enclosure and outer enclosures defining runways extending from the sides of said inner enclosure, an end frame for supporting boards or the like forming the walls of both said enclosures, said end frame including an elongated base runner, a gate frame mounted on said runner, a pair of means for supporting side boards of said runways, clamping means mounting one of said supporting means in spaced relation to each side of said gate frame, a portion of said clamping means extending between the sides of said gate frame and the supporting means for supporting wall members therebetween, and means mounted at the extremity of said runner for supporting the other ends of the side boards.

5. In a farrowing crate having an inner enclosure defined by wall members and end gates, and outer enclosures defined by side boards extending from the sides of the inner enclosure, an end frame comprising: an elongated base runner, an inverted U-shaped gate frame having parallel legs attached to said runner, said gate frame being adapted to support an end gate for the inner enclosure, a pair of channel members attached to the sides of said gate frame in spaced relation thereto for supporting one end of the side boards for the outer enclosure, clamping means interconnecting the legs of said gate frame and said channel members for holding the wall members therebetween, and means mounted at the extremities of said base runner for supporting the other end of said side boards.

6. The end frame of claim 5, in which the top of said gate frame is adapted to support a pivotal gate and stop means are provided limiting pivotal movement of a gate mounted on said frame.

7. The end frame of claim 5, in which L-shaped members are attached to the sides of said gate frame, providing channels for receiving a gate.

8. In an assembly of farrowing crates, the combination comprising: at least three end frames mounted in spaced parallel relation, each end frame including a gate frame, side board supporting means provided on each side of said gate frame, and clamping means connecting said supporting means in spaced relation to said gate frame; and parallel wall members interconnecting said end frames, said wall members being supported by said clamping means and clamped between corresponding gate frame sides and supporting means whereby a plurality of rectangular enclosures are formed by said end frames and wall members.

9. In an assembly of farrowing crates, each crate having an inner enclosure defined by end gates and wall members, the combination comprising: a plurality of end frames arranged in parallel rows, each said end frame including a gate frame and side board supporting means adjacent each side of said gate frame and clamping means interconnecting said gate frame and said side board supporting means; a plurality of parallel pairs of wall members supported by said clamping means between each side of said gate frame and its adjacent side board supporting means, said wall members interconnecting the sides of opposed gate frames; each pair of said wall members and opposed gate frames defining an inner enclosure; and side boards supported by aligned pairs of said supporting means forming walls for outer enclosures extending between adjacent inner enclosures.

10. The assembly of claim 9, further including a dividing wall mounted midway between adjacent enclosures and nearly abutting the opposed side boards for partitioning the runways.

References Cited in the file of this patent
UNITED STATES PATENTS

| | | |
|---|---|---|
| 1,230,237 | Sturm | June 19, 1917 |
| 1,473,970 | Nutt | Nov. 13, 1923 |
| 2,688,308 | Hines | Sept. 7, 1954 |